US012731072B2

(12) United States Patent
Rusu et al.

(10) Patent No.: US 12,731,072 B2
(45) Date of Patent: Sep. 8, 2026

(54) METHODS AND SYSTEMS FOR TRAINING ATTRIBUTE PREDICTION MODELS

(71) Applicant: Xero Limited, Te Aro (NZ)

(72) Inventors: Delia Rusu, Te Aro (NZ); Quentin Gabriel Thurier, Te Aro (NZ); Soon-Ee Cheah, Te Aro (NZ); Rebecca Dridan, Te Aro (NZ)

(73) Assignee: Xero Limited, Te Aro (NZ)

( * ) Notice: Subject to any disclaimer, the term of this patent is extended or adjusted under 35 U.S.C. 154(b) by 158 days.

(21) Appl. No.: 18/028,407

(22) PCT Filed: Sep. 2, 2022

(86) PCT No.: PCT/NZ2022/050119
§ 371 (c)(1),
(2) Date: Mar. 24, 2023

(87) PCT Pub. No.: WO2023/043322
PCT Pub. Date: Mar. 23, 2023

(65) Prior Publication Data

US 2024/0296370 A1 Sep. 5, 2024

(30) Foreign Application Priority Data

Sep. 17, 2021 (AU) ................................ 2021903009

(51) Int. Cl.
*G06N 20/00* (2019.01)
*G06N 5/022* (2023.01)

(52) U.S. Cl.
CPC ............. *G06N 20/00* (2019.01); *G06N 5/022* (2013.01)

(58) Field of Classification Search
CPC ...... G06N 20/00; G06N 5/022; G06N 3/0455; G06N 3/044; G06N 3/0464; G06N 3/048; G06N 3/084; G06Q 40/12; G06F 16/28; G06F 16/22
See application file for complete search history.

(56) References Cited

U.S. PATENT DOCUMENTS

2010/0306282 A1 12/2010 Bennett et al.
2015/0205848 A1* 7/2015 Kumar .................. G06F 16/904 707/754
2018/0121551 A1* 5/2018 Krasadakis ........... G06F 16/958
2019/0108593 A1 4/2019 Yadav et al.
2019/0171913 A1 6/2019 Cheng et al.
(Continued)

FOREIGN PATENT DOCUMENTS

| | | | |
|---|---|---|---|
| CN | 111507321 | B | 9/2020 |
| CN | 112507120 | A | 3/2021 |
| CN | 110347839 | B | 7/2021 |

*Primary Examiner* — Phenuel S Salomon
(74) *Attorney, Agent, or Firm* — Young Basile Hanlon & MacFarlane, P.C.

(57) ABSTRACT

Described embodiments relate to a method comprising: determining a training dataset of example documents, each associated with first and second hierarchical level category labels. The method comprises generating a predicted first hierarchical level category and a predicted second hierarchical level category; determining a first loss value and a second loss value based on the predictions; determining a combined loss value based on the first loss value and the second loss value; and adjusting one or more weights of the numerical representation generation model based on the combined loss value.

20 Claims, 5 Drawing Sheets

(56) References Cited

U.S. PATENT DOCUMENTS

| | | | | |
|---|---|---|---|---|
| 2019/0325308 | A1* | 10/2019 | Chung | G06F 40/216 |
| 2020/0073882 | A1 | 3/2020 | Guggilla et al. | |
| 2020/0302016 | A1* | 9/2020 | Aggarwal | G06N 3/044 |
| 2021/0012103 | A1* | 1/2021 | Bassu | G06F 16/288 |
| 2021/0286989 | A1* | 9/2021 | Zhong | G06N 20/20 |
| 2021/0287301 | A1* | 9/2021 | Young | G06N 20/10 |
| 2022/0019911 | A1* | 1/2022 | Zhou | G06N 20/00 |

* cited by examiner

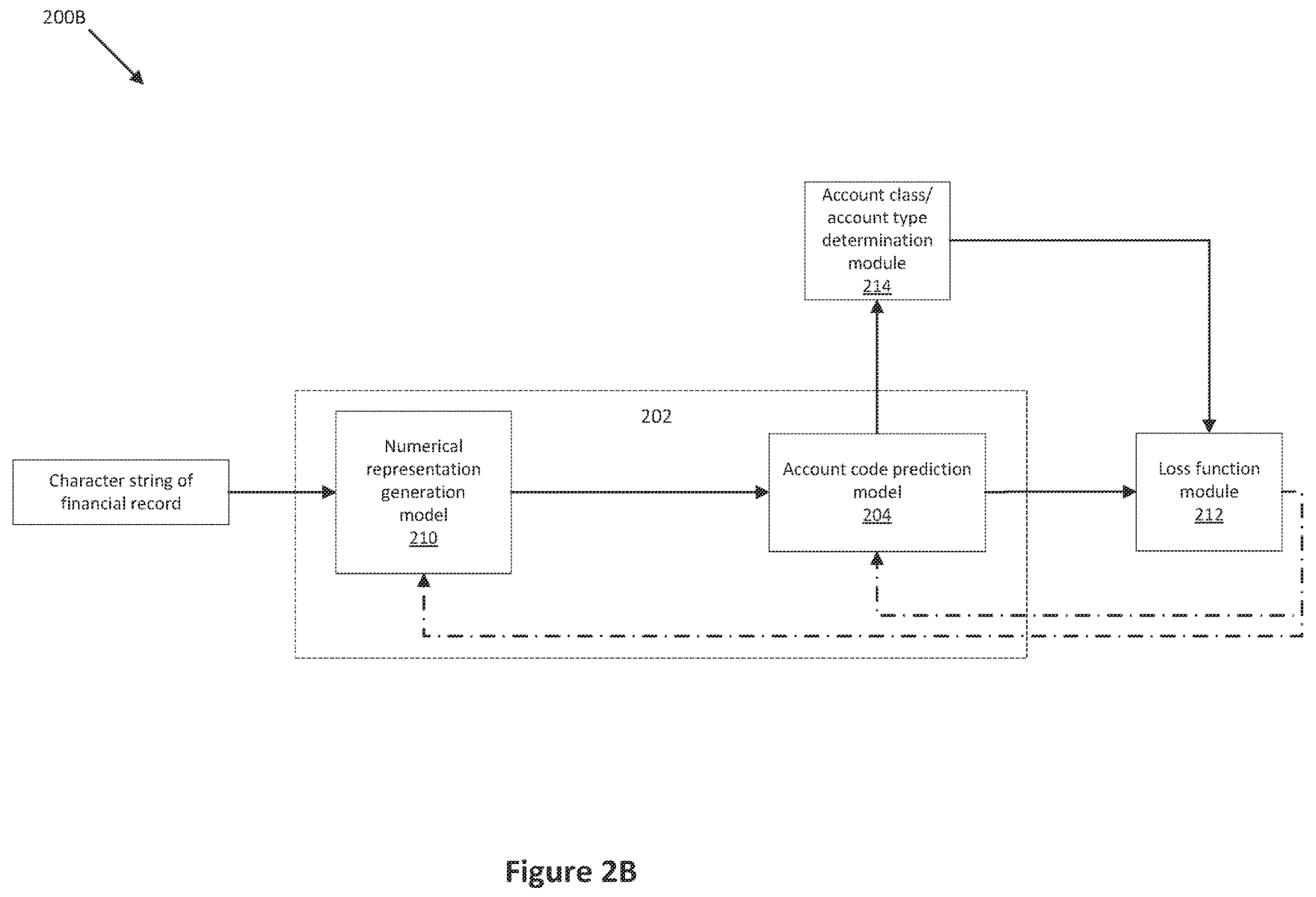

200B

Character string of financial record

202

Numerical representation generation model 210

Account code prediction model 204

Account class/ account type determination module 214

Loss function module 212

Figure 2B

METHODS AND SYSTEMS FOR TRAINING ATTRIBUTE PREDICTION MODELS

CROSS-REFERENCE TO RELATED APPLICATION(S)

This application is a 371 national phase application of International Application Serial No. PCT/NZ2022/050119, filed Sep. 2, 2022, which claims priority to and the benefit of Australian Patent Application Serial No. 2021903009, filed Sep. 17, 2021, the entire disclosures of which are hereby incorporated by reference.

TECHNICAL FIELD

Embodiments generally relate to methods, systems, and computer-readable media for training attribute prediction models, such as a financial record attribute prediction model.

BACKGROUND

Reconciliation is a procedure for determining that the entries (accounting records) in an accounting system match corresponding entries in a financial record, such as a bank statement, or line items in a bank statement feed. When an accountant receives a financial record, such as a bank statement, the accountant has to analyse each entry in the bank statement to identify a corresponding account and account code and potentially further attributes associated with the entry to reconcile the entry with corresponding entries in the accounting system.

However, financial records generated by financial systems often include entries with insufficiently analyse details, which makes it difficult to identify the relevant information for reconciliation. For example, an entry may not include the name of the payer; instead, it may include a general description of the nature of the transaction, such as taxes, drawings, or wages.

Because of the great degree of variability among financial records of a financial system, reconciliation can be a difficult and time-consuming task, more so for a computer program configured to automatically reconcile the data. A person may use their experience to identify the nature of transactions, but automating a computer program to automatically identify the nature of a transaction, as well as the parties of the transaction, is a difficult task due to the lack of standards in providing descriptions for entries in bank statements.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a method comprising: determining a training dataset for training a model, the training dataset comprising a plurality of example documents, each example document being associated with a first hierarchical level category label and a second hierarchical level category label, wherein the first and second hierarchical levels are different hierarchical levels within a hierarchical structure of a common attribute; for each example document in the training dataset: providing the example document to a numerical representation generation model to generate a numerical representation of the example document; providing the numerical representation of the example document to a first hierarchical level attribute predictor to generate a predicted first hierarchical level category; determining a predicted second hierarchical level category; determining a first loss value based on the predicted first hierarchical level category and the first hierarchical level category label associated with the example document; determining a second loss value based on the predicted second hierarchical level category and the second hierarchical level category label associated with the example document; determining a combined loss value based on the first loss value and the second loss value; and adjusting one or more weights of the numerical representation generation model based on the combined loss value; and determining the numerical representation generation model and the first hierarchical level attribute predictor to be a trained transaction attribute prediction model.

The first hierarchical level may be a lower level in the hierarchical structure than the second hierarchical level.

In some embodiments, determining a predicted second hierarchical level category comprises: providing the numerical representation of the example document to a second hierarchical level attribute predictor to generate the predicted second hierarchical level category.

In some embodiments, determining a predicted second hierarchical level category comprises: querying a hierarchical chart of accounts, each account being associated with multiple hierarchical level categories, using the predicted first hierarchical level category; and determining the predicted second hierarchical level category as the parent category of the predicted first hierarchical level category.

Each example document of the training dataset may be further associated with a third hierarchical level category label, wherein the third hierarchical level is different from the first and second hierarchical levels within the hierarchical structure of the common attribute, and the method may further comprise: for each example document in the training dataset: determining a predicted third hierarchical level category; and determining a third loss value based on the predicted third hierarchical level category and the third hierarchical level category label associated with the example document; wherein determining the combined loss value is further based on the third loss value.

In some embodiments, determining the predicted third hierarchical level category comprises: providing the numerical representation of the example document to a third hierarchical level attribute predictor to generate the predicted third hierarchical level category.

In some embodiments, determining the predicted third hierarchical level category comprises: querying a hierarchical chart of accounts, each account being associated with multiple hierarchical level categories, using the predicted first hierarchical level category; and determining the predicted third hierarchical level category as the grandparent category of the predicted first hierarchical level category.

The first hierarchical level of the hierarchical structure of the common attribute may be an account code. The second hierarchical level of the hierarchical structure of the common attribute may be an account type. The third hierarchical level of the hierarchical structure of the common attribute may be an account class.

The second hierarchical level of the hierarchical structure of the common attribute may be an account class. The first hierarchical level of the hierarchical structure of the common attribute may be an account type. The second hierarchical level of the hierarchical structure of the common attribute may be an account class.

In some embodiments, determining the combined loss value comprises: applying a first weighting to the first loss value and applying a second weighting to the second loss value.

In some embodiments, the method further comprises deploying the trained transaction attribute prediction model on an accounting system.

Some embodiments relate to a system comprising: one or more processors; and memory comprising computer executable instructions, which when executed by the one or more processors, cause the system to perform any one of the described methods.

Some embodiments relate to a computer-readable storage medium storing instructions that, when executed by a computer, cause the computer to perform the method of any one of the described methods.

BRIEF DESCRIPTION OF DRAWINGS

Various ones of the appended drawings merely illustrate example embodiments of the present disclosure and cannot be considered as limiting its scope.

FIG. 2B is a block diagram illustrating components of a machine-learning (ML) network configured to train the attribute prediction model, according to some other embodiments;

DESCRIPTION OF EMBODIMENTS

Figure 1:
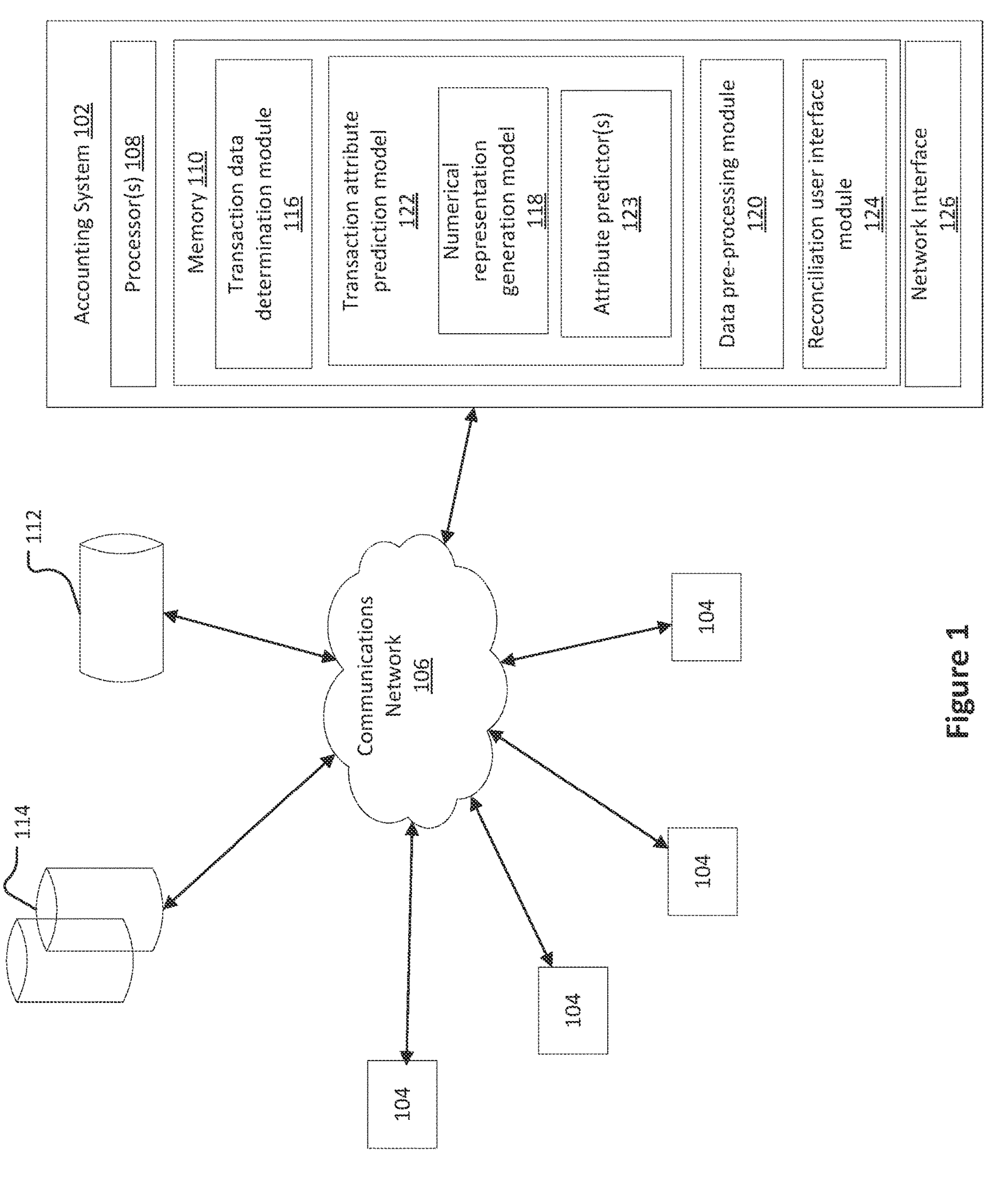
FIG. 1 is a block diagram of a system for facilitating the management of financial records, according to some embodiments.

Embodiments generally relate to methods, systems, and non-transitory computer-readable storage medium or media storing instructions for training attribute prediction models, such as a financial record attribute prediction model. Some embodiments relate specifically to training an account code prediction model.

The process of reconciling financial records associated with transactions, such as bank statements or statements line, such as those received from a bank via a live feed, tends to involve associating the financial record with a corresponding accounting record (for example, an entry in a general ledger) relating to a same, or common, transaction. For example, an accounting system, such as a cloud based accounting platform, may be configured to maintain accounting records for a plurality of individuals or entities, and may be configured to receive financial records and facilitate the reconciling of the financial records with an associated accounting record.

The accounting record may comprise information regarding a transaction, such as an accounting code, the name of an entity associated with the transaction (e.g., the counter party) and other attributes associated with the transaction. In some circumstances, an accounting record may be created before the transaction occurs in the real world. For example, an accounting record, such as an invoice, may be generated using the accounting system and sent to a customer. Once the customer makes a payment, the accounting system receives a financial record associated with the transaction. The financial record then needs to be reconciled, ideally with the accounting record associated with the transaction. However, in some situations, a financial record may be received before or without any corresponding accounting record having been generated. For example, a business may have made a payment for some business expenses without creating an accounting record. In these cases, when the financial record is received at the accounting system, an accounting record should be created in order to reconcile the transaction.

Creating accounting records can be an arduous and time-consuming process as the information in the financial record may not be sufficiently analyze for humans or automated processes to identify the various attributes associated with the transaction, such as an account code associated with the transaction, for example.

Accounting systems generally allow a business or entity to track its transactions in a structure suitable for financial reporting according to accounting practices and regulatory requirements. Accounting systems may also provide mechanisms for monitoring transaction data according to specific accounting categories or accounting codes. Accounting codes define various categories or indexes or names of accounts with which transactions may be associated. Example accounting codes include cash, accounts receivable, sales, and account payables. Accounting codes may also be assigned a unique accounting code number or an alphanumeric string. Businesses or entities may select predefined accounting codes from a library of accounting codes as may be provided by the accounting system, for example, and/or may create or define bespoke accounting codes to suit their particular financial reporting and tracking requirements. Businesses or entities may define accounting codes that may be tailored to their specific financial tracking or reporting needs. For example, an entity involved in trade of distinct product categories may define a distinct account code for revenues associated with each product category. Accordingly, different businesses or entities may have different charts of accounts tailored to their particular financial reporting needs.

By associating financial records of transactions with accounting codes, transactions can be categorised or labelled. The categorisation of financial records using accounting codes may assist in monitoring the performance of the entity, and/or for financial reporting. For example, the accounting system may allow a user to filter their transactions by accounting code to generate a subset of transactions that relate to specific transactions associated with distinct tax obligations.

A well-trained account code prediction model allows for improved determination of account codes of financial records of transactions, and in some embodiments, improved reconciliation of financial records with corresponding accounting records using the determined account code. In some embodiments, reconciling the financial record with a corresponding accounting record comprises creating or generating the corresponding accounting record.

Described embodiments relate to an improved method of training an account code prediction model by exploiting the hierarchical classification structure of a chart of accounts.

Transactions can be classified using a taxonomy or a hierarchical classification structure or arrangement. For example, the hierarchical classification structure may be a tree structure. The hierarchical classification structure comprises a plurality of levels, each comprising one or more nodes. The node(s) of a first level, closest to a root node, are indicative of first category(ies) of transactions. The first category(ies) of transactions may be of a relatively high level of generality. For example, the first category(ies) of transactions may be indicative of a class, or account class, of transactions. The account class may be indicative of whether assets, liabilities or equity are being affected by the transaction, as for example, may be reflected on a balance sheet. One or more of the nodes of the first level may be connected to one or more nodes of a second, lower lever of the hierarchical classification structure. The nodes of the second level are second category(ies), indicative of sub-category(ies) of the first category(ies) of transactions. For example, a node of a second level that stems from a node of a first level is a child node of the node of the first level (i.e., parent). The second category(ies) of transactions may be of a relatively lower level of generality, or are more specific and granular than the first category(ies) of transactions. The second category(ies) of transactions may be indicative of a type, or account type, of a transaction. The account type may be a type of revenue, expenditure or transfer associated with the transaction, as for example, may be reflected in operating ledger accounts. One or more of the nodes of the second level may be connected to one or more nodes of a third, lower lever of the hierarchical classification structure. The nodes of the third level are third category(ies), indicative of sub-category(ies) of the second category(ies) of transactions. For example, a node of a third level that stems from a node of a second level is a child node of the node of the second level (i.e., grandparent). In some embodiments, the nodes of the third level may be leaves. The third category(ies) of transactions may be of a relatively lower level of generality, or are more specific and granular than the first and second category(ies) of transactions. The third category(ies) of transactions may be indicative of an account code, such as an account code name and/or an account code number, specifying a particular account.

Each account or attribute has multiple hierarchical level categories within the hierarchical classification structure of a chart of accounts. The hierarchical nature of the chart of accounts means that there are multiple levels of correctness or incorrectness in classifying a transaction; a predicted account code for a transaction may be incorrect, but the class or type of the account code predicted may actually be correct; the predicted account code may be wrong, but it may have a degree of correctness about it. So, although predicting a correct account code would be the ideal output of the trained account code prediction model, predicting the correct account class and/or account type but not the correct account code would be more beneficial than predicting the wrong account class and/or account type as well as the wrong correct account code. Accordingly, creating or populating an accounting record for a candidate financial record using the predicted account code would cause the associated transaction to be recorded on the correct side of the balance sheet, or a correct section of a tax form, even if not necessarily with the correct account code. This may be of particular relevance where compliance with particular standards is important or necessary. For example, even if a lower hierarchical level category prediction of an attribute were incorrect, if a higher hierarchical level category prediction of the attribute were correct, a compliance requirement may still be considered to have been met. On the other hand, incorrectly predicting the higher hierarchical level category may have much more serious compliance implications.

Described embodiments involve training the account code prediction model to favour error cases where the predicted account code is correct or belongs to one or more correct upper levels in the chart of accounts (i.e., a correct second and/or first level of the hierarchical structure). In this way, the trained account code prediction model may be inclined to predict an account code that may have a correct class and/or type, even if an account code prediction isn't considered sufficiently accurate or correct.

To this end, some embodiments involve providing numerical representations of statement lines of example financial records to a multi-headed prediction model. The multi-headed prediction model comprises an account code prediction model, and one or both of an account class prediction model and an account type prediction model. The outputs of each of the models, which may be indicative of a likelihood or probability of the example financial record belonging to particular account classes, account types and/or account codes, respectively, are provided to a loss function module or component to determine a loss value, such as a categorical cross entropy, for the predicted values based on the respective target labels for the example. The loss values for each model may be combined and back-propagated through the account code model and the numerical representation generation model to adjust the weight(s) of the account code prediction model and the numerical representation generation model being trained.

In other embodiments, the numerical representations of statement lines of example financial records are provided to an account code prediction model, which determines a predicted first hierarchical level attribute category. The predicted first hierarchical level attribute category is then provided to an account class and/or account type determination module, which consults with a chart of accounts for the attribute using the predicted first hierarchical level attribute category to thereby determine the predicted account class and/or account type. The predicted account class and/or account type is compared with the respective account class and/or account type label of the example document and a respective loss value is determined based on the comparison. The loss values for each prediction may be combined and back-propagated through the account code model and the numerical representation generation model to adjust the weight(s) of the account code prediction model and the numerical representation generation model being trained.

Predicting hierarchical account attributes such as class and/or type, jointly with the account code may improve performance of the account code prediction model being trained. As predicting the other hierarchical account attributes are connected auxiliary tasks, the process of learning to predict the other hierarchical account attributes may share some hidden logic with the process of learning to predict the account code. It may help to reduce a number of potential account codes from which a best account code is being selected by the account code prediction model.

FIG. 1 illustrates a block diagram of a system 100 for facilitating the management of financial records, according to some embodiments. The system 100 comprises an accounting system 102, which includes the hardware and software necessary to provide accounting software or an accounting software service. In some embodiments, accounting software or an accounting software service provided by the accounting system 102 may be accessible to a client device 104 via a communications network 106, such as the Internet. The accounting system 102 may provide centralised web-based accounting software to a large number of businesses or individuals. For example, the accounting system 102 may be accessible by businesses or individuals using the client device 104 and an internet connection to the accounting system 102. The client device 104 may be an end-user computing device such as a desktop computer, a laptop computer, a mobile device or a tablet device for example.

The accounting system 102 comprises at least one processor 108 and memory 110. The processor(s) 108 may include an integrated electronic circuit that performs the calculations such as a microprocessor, graphic processing unit, for example. In some embodiments, the accounting system 102 may be implemented as a distributed system comprising multiple server systems configured to communicate over a network to provide the functionality of the accounting system 102.

Memory 110 may comprise both volatile and non-volatile memory for storing executable program code, or data. Memory 110 comprises program code which when executed by the processor 108, provides the various computational and data management capabilities of the accounting system 102. The block diagram of FIG. 1 illustrates some of the modules stored in memory 110, which when executed by the processor(s) 108, of the accounting system 102, performs the functionality of the accounting system 102 as described below.

The system comprises a database 112 for storing data used by the accounting system 202 to provide the accounting software services. The database 112 may be implemented using a relational database or a non-relational database or a combination of a relational database and a NoSQL database. The database 112 may be implemented as a distributed system to meet potential scalability requirements of the accounting system 102. The accounting system 102 may access the database directly or via the communications network 206.

The database 112 may comprise transaction data associated with transactions between various entities. At least some of the data in the database 112 is specific to a particular business or entity, and each business or entity using the accounting system 102 has access to data and/or records relating to its own business.

The transaction data may comprise accounting data, such as accounting records of users of the accounting system 102. Accounting records may comprise records regarding transaction-related documents created by a business using the accounting system 102. Accounting records may include bills, invoices, receipts, for example. The accounting data or records may include entity data, and/or hierarchical account classification data.

Entity data may include data regarding other business or individuals or entities or contacts that a specific business or entity may transact with. Entity data may comprise name or an entity, contact details such as email and/or phone numbers, a physical address, a web address, entity identification numbers such as a company number, for example. Each entity record may correspond to a real word entity, business or individual that a business may perform transactions with.

The hierarchical account classification data comprises a hierarchical structure comprising multiple hierarchical levels for classifying transactions as being associated with or belonging to particular accounts. For example, a first or higher hierarchical level may be an account class. A second and lower hierarchical level to the first hierarchical level (for example, "child" node) may be account type. A third and lower hierarchical level to the second hierarchical level and the first hierarchical level (for example, "grandchild" node to the first hierarchical level) may be account code. Accordingly, the hierarchical account classification data may comprise two or more of account code data, account type data and/or account class data.

Account code data may include an account code identifier such as an account code name and/or an account code number. The account code data may comprise definitions of account codes for a specific business or entity, and/or generic definitions of account codes that may be used by a plurality of different businesses or entities (e.g., standardized account codes). In other words, a business may define a set of its own account codes or it may use a set of standardised account codes or a combination of both. Examples of account code may include Accounts Payable, Accounts Receivable, Rent, Investments, etc.

Account type data may comprise account type identifiers, each indicative of a type of account associated with a particular transaction. Account type data indicates the type of revenue, expenditure or transfer associated with the transaction, as for example, may be reflected in general ledger accounts. Examples of account types include current assets, fixed assets, intangible assets, liability, current liability, long term liabilities, depreciation, bank, revenue, sales, prepayment, non-current assets, expenses, other income, overheads, direct costs, shareholders' funds, etc.

Account class data may comprise account class identifiers indicative, each indicative of a class of account associated with a particular transaction. The account class may be indicative of whether an asset, equity or liability is being affected by the transaction, as for example, may be reflected on a balance sheet. Examples of account class include liability, equity, expense, asset, revenue.

Each accounting record may comprise information including one or more of: an account code name (for example, Accounts Payable, Accounts Receivable), a unique account code or number (for example, 800, 610), an account type (for example, current liability, fixed asset, equity, depreciation), an account class (for example, liability, expense, asset, equity, revenue), an account code description (for example, 'Outstanding invoices the company has received from suppliers but has not yet paid at balance date'), and/or account code tax category or designation (for example, 'GST Free Expense' or 'GST on Income').

The transaction data may comprise financial data. The financial data, such as financial records may comprise records relating to a transaction performed by an entity, or between and first and second entity. A financial record may include a credit transaction, a debit transaction or a transfer within two bank accounts of the business, for example. In some embodiments, financial records are generated by one or more financial systems 114, which may be external to the accounting system 102. The financial system 114 may include banking systems, credit card systems, online payment systems, cryptocurrency payment systems or any other system that enables payment of any kind from one individual or entity to another individual or entity. The financial records, such as data from bank statements and/or bank feeds, may be received or obtained by the accounting system 102, directly or indirectly, from the financial systems 114.

For example, in some embodiments, memory 110 of the accounting system 102 comprises a transaction data determination module 116. The transaction data determination module 116 comprises program code, which when executed by the processor(s) 108, causes the accounting system 102 to extract transaction data from the financial system(s) 114. In some embodiments, entities, such as businesses, using the accounting system 102 may configure the accounting system 102 to periodically, or aperiodically, request or extract transaction data from the financial system(s) 114 and store the extracted transaction data as financial records in the database 112. The extraction of the financial records may be facilitated using financial system connection data as may be stored in the database 112. For example, the financial system connection data may comprise bank account details, connection credentials and/or other data necessary to configure the accounting system 102 queries and extract transaction data specific to a business from the financial system(s) 114. A business may use several bank accounts or financial systems for sending or receiving payments by configuring the accounting system 102 to extract transaction data from the financial system(s) 114 and store the data as financial records in the accounting system database 112. The financial system connection data may comprise access credentials or information to allow the accounting system 102 to establish a communication link with financial system(s) 114 over the communications network 106. The access credentials or information may include a financial system identifier (such as the name of a bank), a bank account number, and access credentials such as a password, for example. Where multiple financial records are received as financial data, the transaction data determination module 116 may process the financial data to determine or extract individual financial records. Each determined financial record may include one or more attributes such as transaction data, payee details, a reference, a description, a transaction amount, transaction currency, and/or transaction type detail. Each determined financial record may be reconciled by allocating to the financial record, an account code, type and/or class identifier and optionally associating it with at least one entity.

The transaction data may comprise reconciliation data or reconciliation records. Reconciliation records may be created when a transaction record is reconciled with an accounting record (pre-existing or newly created), or in some embodiments, when a financial record is associated with an account code, account type, account class and/or an entity. For example, as financial records are received from the financial systems 112, the financial record may be reconciled by allocating a specific account code from the account code data to the financial record. The reconciliation record may comprise information regarding the specific account code from the account code data used to reconcile a specific financial record. In some embodiments, an accounting record associated with a financial record may be created based on the reconciliation record and the allocated specific account code from the account code records.

Referring again to FIG. 1, memory 110 may comprise a transaction attribute prediction model 122. The transaction attribute prediction model 122 comprises program code which, when executed by the processor(s) 108, causes the accounting system 102, to determine one or more attributes of transaction data, and in some embodiments, to identify one or more attributes related to a financial record, such as an account code identifier associated with the transaction to which the financial record relates.

The transaction attribute prediction model 122 comprises one or more attribute predictors 123. In some embodiments, the transaction attribute prediction model 122 comprises an account code predictor 123 or prediction model configured to process a numerical representation of a candidate financial record to determine one or more suggested or recommended account codes for reconciling the candidate financial record. The attribute predictor 123 may be a multi-class classifier. For example, the suggested or recommended account code(s) may be selected from a set of possible account codes. The transaction attribute prediction model 122 may be configured to classify a candidate financial transaction as being associated with suggested account code (s) from the set of account codes.

In some embodiments, the transaction attribute prediction model 122 may include a feedforward neural network, or a convolutional neural network, or a recurrent neural network or a transformer based neural network to process the candidate financial record.

In some embodiments, the transaction attribute prediction model 122 (or attribute predictors 123 of the transaction attribute prediction model 122) may be configured to generate a confidence score associated with each respective suggested account code. The recommended account code may be an accounting entity defined (e.g., user defined or created) account code, and/or may be an accounting system predefined account code (such as generic accounting codes provided by the accounting system as options for users).

The transaction attribute prediction model 122 comprises a numerical representation generation model 118. The numerical representation generation model 118 comprises program code which, when executed by the processor(s) 108, causes the accounting system 102 to generate a numerical representation of inputs, such as transaction data, provided thereto. In other words, the numerical representation generation model 118 may be configured to receive a character string of a financial record, such as a character string of a statement line, and provide as an output, a numerical representation of the character string. The numerical representation generation model 118 may be configured to provide the generated numerical representation as an input to the attribute predictor(s) 123.

Machine learning algorithms operate on a numeric feature space, expecting input as a two-dimensional array where rows may be instances and columns may be features. To perform machine learning on select data, the select data is converted into vector representations so that it is suitable for numeric machine learning. This process may be referred to as feature extraction or vectorization. The vectorisation process transforms the relevant data from a sequence of words or characters to points that occupy a high-dimensional semantic space. Points in space can be close together or far apart, tightly clustered or evenly distributed. Semantic space is therefore mapped in such a way where data or records that are similar are closer together and those that are different are farther apart. By encoding similarity as distance, the numerical representation generation model 118 derives the principal components of the data and enables decision boundaries to be drawn in the semantic space.

In some embodiments, the numerical representation generation model 118 may be configured to generate numerical representations of transaction data. Transaction data may comprise financial data or records, such as data from bank statements, statement lines and/or bank feeds, and/or may comprise accounting or bookkeeping data, as maintained by the accounting system for a plurality of entities. Transaction data comprises one or more elements or data strings, which may be comprehensible by humans. For example, each data string may comprise one or more characters, which may be numbers, letters or other non-alphanumeric characters such as /, %, $, # etc. However, to allow the accounting system 202 to perform various described methods, such as methods involving natural language processing, a numerical representation of the data strings of the transaction data is generated by the numerical representation generation model 118.

The numerical representation generation model 118 may be configured to generate a numerical representation in the form of a vector using a vectorisation technique suitable for natural language processing tasks. In some embodiments, the numerical representation generation model 118 may be configured to generate numerical representations using a corpus of words or data strings extracted from documents and/or records such as may be stored in the database 112 accessible to the accounting system 102. For example, the documents and/or records used to generate the corpus may comprise transaction data, financial and/or accounting record data, account code data, account type data and/or account class data.

In some embodiments, the numerical representation generation model 118 uses one-hot encoding to generate the numerical representation. The numerical representation produced using one-hot encoding may be in the form of a sparse vector with a positive value corresponding to only the feature or word present in a transaction record.

In some embodiments, the numerical representation generation model 118 uses a term frequency-inverse document frequency (TF-IDF) technique to generate the numerical representation. The TF-IDF technique takes into account the relative frequency or rareness of tokens or words in a transaction record against their frequency in all or a relatively large set of transaction records, as for example may be stored in the database 112. The TF-IDF technique is based on the principle that the most meaningful information of a record is most likely encoded in the more rare terms used in the record. TF-IDF based vectorisation normalizes the frequency of words or tokens in a transaction record with respect to the rest of the corpus determined from transaction records, for example, as may be stored in the database 112. TF-IDF is computed on a per-token or per-word basis, such that the relevance of a token to a transaction record is measured by the scaled frequency of the appearance of the token in the transaction record, normalized by the inverse of the scaled frequency of the term in a larger corpus of transaction records, which may be obtained, for example, from the database 112.

In some embodiments, the numerical representation generation model 118 uses a word embedding based technique to generate the numerical representation of transaction data such as financial records. A word embedding is a learned representation for text where words or characters that have the same meaning have a similar representation. Word embeddings include a class of techniques where a transaction record is represented as a numerical representation in the form of a real-valued vector in a predefined vector space. Each transaction record may be mapped to one vector. Transforming transaction records into numerical representations using word embeddings allows mathematical operations to be performed on the numerical representations. The mathematical operations may include determination of a similarity or relatedness metric for two vectors. The similarity or relatedness metric may indicate how semantically similar two vectors are. The similarity or relatedness metric may be determined using any one the techniques of cosine similarity, Euclidean distance, logistic regression, gradient boosting machine, or a trained neural network, for example.

In some embodiments, the numerical representation generation model 118 may comprise a trained neural network to generate the word embeddings or vectors corresponding to each token of the transaction data. The neural network for generating the word embeddings may be trained based on the feedback generated using historically reconciled financial records, for example, as may be obtained from the database 112. The feedback may be generated by using a loss function such as a categorical cross-entropy loss function. In some embodiments, the numerical representation generation model 118 may include one or more language models such as the Bidirectional Encoder Representations from Transformers (BERT) language model.

In some embodiments, data to be vectorised, such as the financial records, account codes, entity names and/or entity attributes, may comprise multiple data strings or words and the numerical representation generation model 118 may generate the numerical representation of the entire data using an average of each character or word or token of the data. In some embodiments, 32, 64 or 128 dimensions may be selected for the numerical representation of data.

Memory 110 may comprise a data pre-processing module 120 including program code which, when executed by the processor(s) 108, causes the accounting system 102 to perform data pre-processing, which may improve the efficiency and/or accuracy of the operations performed by the accounting system 102. Pre-processing operations may include operations that are performed on financial records received by the accounting system 102 from the financial system 114. Pre-processing operations may include removal of semantically irrelevant characters or strings in financial records. Semantically irrelevant characters or strings include characters or strings that do not have meaningful information relevant to account code determination or entity name determination. For example, financial records comprising a long sequence of numbers may be removed from the financial records during pre-processing.

Pre-processing of financial records may also include replacement of a pre-defined pattern of characters or strings with a pre-defined replacement token that better captures the semantic meaning of the replaced pre-defined pattern of characters or strings. The pre-defined pattern of characters or strings for replacement may be identified using one or more regular expressions provided in the pre-processing module 120. The replacement of a pre-defined pattern of characters or strings with a pre-defined replacement token may bring about greater consistency in financial records originating from distinct sources and may improve the performance and/or accuracy of the attribute determination operations performed by a transaction attribute prediction model 122 of the accounting system 102.

One example of pre-processing operation relates to financial records comprising credit card numbers. The specific credit card number may not include relevant information to assist in account code or entity determination. Pre-processing of financial records including credit card numbers may include replacing the credit card numbers with a replacement token such as '<CC_NUM>'. By performing this replacement, the general information regarding the presence of a credit card number is captured, while the specific information relating to a particular credit card number is removed to improve the overall accuracy of the transaction attribute determination. Another example or a pre-processing operation includes replacement of end of line characters in financial records with a replacement token such as '<END_OF_LINE>.'

Memory 110 may also comprise a reconciliation user interface module 124 to present predicted or determined transaction-related attributes to a user and/or to receive user input in response to the predicted transaction-related attributes, such as approval of the determined transaction-related attributes and/or the approval of the association of an accounting record generated with the determined transaction-related attributes with the financial record. The reconciliation user interface module 124 may be part of a web application module (not shown) configured to make the accounting software interface available to the client device 104.

The accounting system 102 further comprises a network interface 126 to facilitate communications with components of the system 100 across the communications network 106, such as the computing device(s) 104, database 112 and/or other servers, including financial institute or banking server. The network interface 126 may comprise a combination of network interface hardware and network interface software suitable for establishing, maintaining and facilitating communication over a relevant communication channel.

Figure 2A:
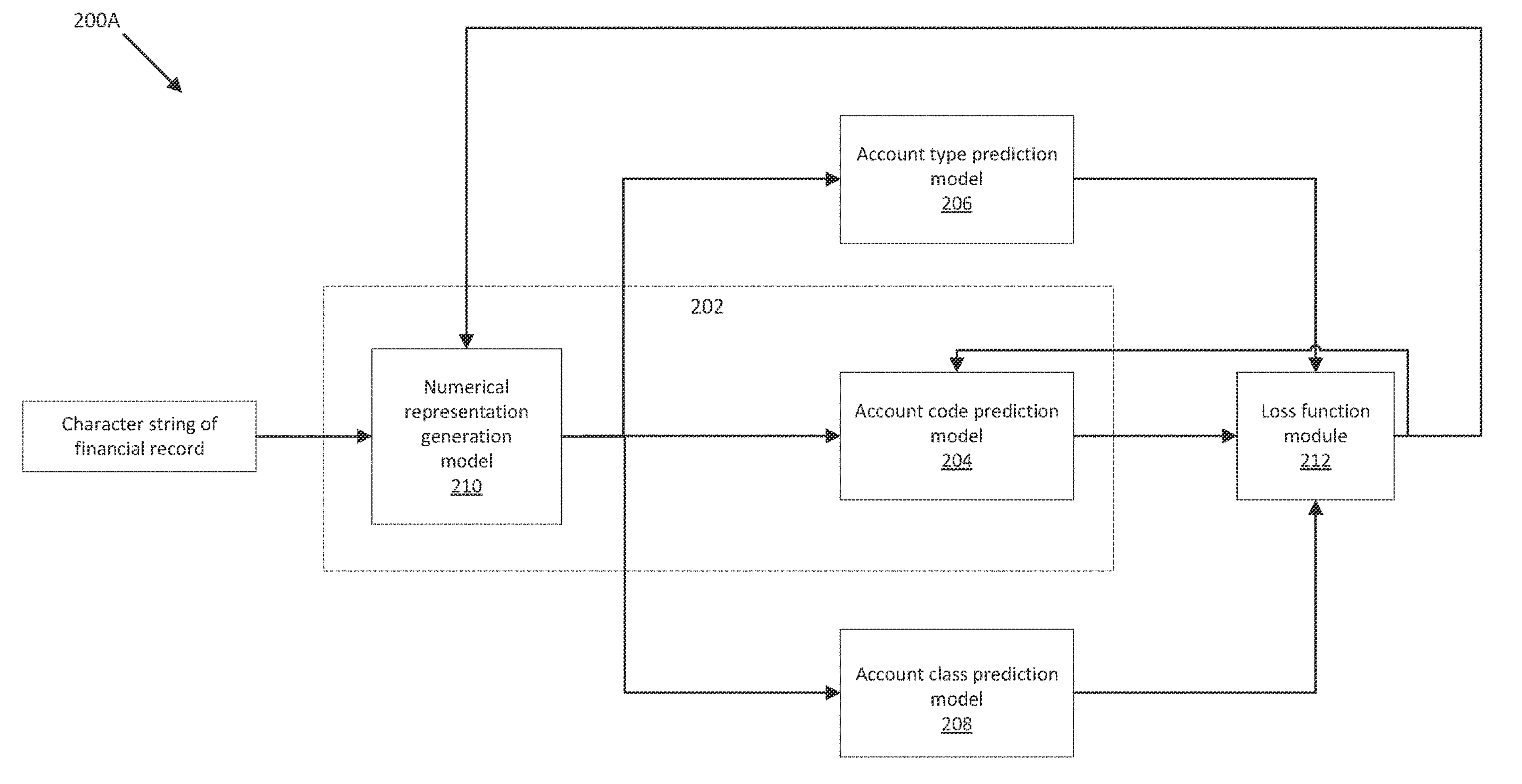
FIG. 2A is a block diagram illustrating components of a machine-learning (ML) network configured to train the attribute prediction model, according to some embodiments.

Referring now to FIG. 2A, there is illustrated a schematic of a ML network 200 comprising components used to train the transaction attribute prediction model 122. In some embodiments, the ML network 200 may be deployed on, or be otherwise accessible to the accounting system 102.

As illustrated in FIG. 2A, the ML network 200A comprises a transaction attribute prediction model 202. In some embodiments, the transaction attribute prediction model 202 comprises a numerical representation generation model 210 and a hierarchical level attribute predictor, such as a first hierarchical level attribute predictor 204.

In some embodiments, the ML network 200A comprises one or more additional hierarchical level attribute predictors, such as a second hierarchical level attribute predictor 206 and/or a third hierarchical level attribute predictor 208. Each of the first, second and third hierarchical level attribute predictors 204, 206, and 208 may be configured to determine a different level of a related attribute within a hierarchical structure. For example, in some embodiments, the ML network 200A comprises a first hierarchical level attribute predictor 204 and a second hierarchical level attribute predictor 206. In some embodiments, the ML network 200A comprises a first hierarchical level attribute predictor 204, a second hierarchical level attribute predictor 206 and a third hierarchical level attribute predictor 208. In some embodiments, the ML network 200A comprises a second hierarchical level attribute predictor 206 and a third hierarchical level attribute predictor 208. For example, the first hierarchical level attribute predictor 204 may be configured to predict or determine an account code identifier associated with a candidate financial record, the second hierarchical level attribute predictor 206 may be configured to predict or determine an account type identifier associated with a candidate financial record, and/or the third hierarchical level attribute predictor 208 may be configured to predict or determine an account class identifier associated with a candidate financial record.

The first, second and/or third hierarchical level attribute predictor(s) 204, 206, 208 may be multi-class classifiers. For example, the first hierarchical level attribute predictor 204 may be configured to classify an example or candidate financial document (or numerical representation thereof) as being associated with a first hierarchical level attribute of a plurality of (or a set of) first hierarchical level attributes. Similarly, the second hierarchical level attribute predictor 206 may be configured to classify an example or candidate financial document (or numerical representation thereof) as being associated with a second hierarchical level attribute of a plurality of (or a set of) second hierarchical level attributes and/or the third hierarchical level attribute predictor 208 may be configured to classify an example or candidate financial document (or numerical representation thereof) as being associated with a third hierarchical level attribute of a plurality of (or a set of) third hierarchical level attributes.

The transaction attribute prediction model 202 may be trained using a training dataset of example documents, which may be previously reconciled financial records, with each document associated or labelled with at least two transaction attributes, such as an account code, an account type and/or an account class, for example. An example training data set is shown in Table I below.

TABLE 1

Example training dataset

| Example document (bank feed statement line) | Attributes | | |
|---|---|---|---|
| | Account class label | Account type label | Account name and code label |
| Debit Card Purchase FACEBK *XX1XXXXXX1 fb.me adsIRL | Expense | Overheads | Advertising, Marketing and Promotion (727) |
| Mrs J Citizen Secretary Monthly Salary | Expense | Direct costs | Direct Wages (429) |
| NAB INTNL TRAN FEE - (SC) | Expense | Overheads | Bank Fees (433) |
| Transfer from Mrs Jane Citizen NPP | Expense | Overheads | Freight and Courier (721) |
| Monthly Plan Fee | Expense | Overheads | Bank Fees (433) |
| Debit Card Purchase Paypal *EBAU AU GST11111111 AUS | Expense | Overheads | Computer Expense (411) |

The first, second and/or third hierarchical level attribute predictor(s) 204, 206, 208 are configured to receive, from the numerical representation generation model 210 of the transaction attribute prediction model 202 (which may be similar to or the same as numerical representation generation model 118 of FIG. 2A and FIG. 2B), numerical representations of the example documents, which may be transaction or financial records, such as character strings from statement lines. In other words, the first, second and/or third hierarchical level attribute predictor(s) 204, 206, 208 may have or avail of a shared or common numerical representation generation model 210. In some embodiments, the numerical representation generation model 118 is trained, pre-trained and/or operates according to methods described in Applicant's co-pending International Patent Application No. PCT/NZ2021/050151 filed on 25 Aug. 2021 and entitled "Transaction data processing systems and methods", the entire content of which is incorporated herein by reference.

The first hierarchical level attribute predictor 204 is configured to generate a predicted first attribute label, such as a predicted account code, based on the received numerical representation of an example document.

In embodiments where the ML network 200A comprises second and/or first hierarchical level attribute predictor(s) 206, 208, such as in the embodiment depicted in FIG. 2A, the second and/or third hierarchical level attribute predictor (s) 206, 208 may be configured to generate respective predicted second and/or third attribute labels, such as a predicted account type and/or account code, based on the received numerical representation of an example document, as for example received from the common numerical representation generation model 210.

In some embodiments, where each of the first, second and/or third hierarchical level attribute predictor(s) 204, 206, 208 are multi-class classifiers, they are each configured to determine a score indicative of the example document being associated with, or belonging to, each classification set (an entity specified set of attributes, a predefined (e.g. accounting system) set of attributes, or a mixture of both). The scores may be converted into probability values using a softmax function layer. The attribute from the classification set having the highest probability level is considered as being the predicted attribute label.

In some embodiments, the output of one of the first, second and/or third hierarchical level attribute predictor(s) 204, 206, 208 may be used to inform or reduce the set of classes or predicted labels that another of the first, second and/or third hierarchical level attribute predictor(s) 204, 206, 208 may select from. For example, if the third hierarchical level attribute predictor 208 predicted a third hierarchical level attribute category (e.g., a particular account class) for an example document, the first and/or second hierarchical level attribute predictors 204, 206 may be restricted from selecting as their predicted first and/or second hierarchical level attribute category, a category that does not belong to the same attribute in the hierarchical structure as the predicted third hierarchical level attribute category. For example, if the third hierarchical level attribute predictor 208 predicted account class "Expense", the second hierarchical level attribute predictor 206 may be limited to selected only account types that are child nodes of the account class "Expense" in the chart of accounts. Similarly, the first hierarchical level attribute predictor 204 may be limited to selected only account codes that are grandchild nodes of the account class "Expense" in the chart of accounts. In other embodiments, the second and/or third hierarchical level attribute predictors 206, 208 may be restricted from selecting as their predicted second and/or third hierarchical level attribute categories, a category that does not belong to the same attribute in the hierarchical structure as the predicted first hierarchical level attribute category.

In some embodiments, the output of one of the first, second and/or third hierarchical level attribute predictor(s) 204, 206, 208 may be used to inform the set of classes or predicted labels that another of the first, second and/or third hierarchical level attribute predictor(s) 204, 206, 208 In some embodiments, some or all of the first, second and/or third hierarchical level attribute predictor(s) 204, 206, 208 are configured similarly to methods described in Applicant's co-pending International Patent Application No. PCT/NZ2021/050151 filed on 25 Aug. 2021 and entitled "Transaction data processing systems and methods", the entire content of which is incorporated herein by reference. The first, second and/or third hierarchical level attribute predictor(s) 204, 206, 208 may each comprise a neural network, a feedforward neural network, or a convolutional neural network, or a recurrent neural network, or a transformer-based neural network. In some embodiments, the first, second and/or third hierarchical level attribute predictor(s) 204, 206, 208 comprise a feedforward neural network to determine a confidence score indicating the suitability of an hierarchical level attribute (such as an account class, an account type and/or an account code, respectively), for a specific financial record. The feedforward neural network may comprise 2, 3 or 4 layers of neural networks for example. The feedforward neural network may incorporate a rectified linear activation function in an activation layer. During the training of the feedforward neural network, in some embodiments, an initial learning rate of 0.001 may be used for example. The learning rate may be decremented using a learning rate decay value of 0.2 every 2, 4 or 6 training epochs in some embodiments.

In some embodiments, as depicted in FIG. 2A, the ML network 200B comprises the transaction attribute prediction model 202 comprising the numerical representation generation model 210 and the hierarchical level attribute predictor, such as a first hierarchical level attribute predictor 204, as described above with respect to the ML network 200A of FIG. 2A. However, in the embodiments depicted in FIG. 2A, the ML network 200B comprises a hierarchical level attribute determination module 214. The hierarchical level attribute determination module 214 is configured to receive the predicted first hierarchical level attribute category from the first hierarchical level attribute predictor 204 and to determine, based on the predicted first hierarchical level attribute category, a predicted second hierarchical level attribute category, and in some embodiments, a predicted third hierarchical level attribute category.

In some embodiments, the hierarchical level attribute determination module 214 determines the predicted second and/or third attribute labels by consulting or querying a hierarchical chart of accounts, as for example, may be stored in database 112. For example, the predicted first attribute label may be a lower hierarchical level category of a particular attribute within the hierarchical chart of accounts. By consulting the hierarchical chart of accounts to step backwards through the hierarchical chart of accounts, higher hierarchical level categories can be identified.

In the embodiments of both FIGS. 2A and 2B, a loss function module 212 of the ML network 200A, 200B determines a loss function value for each of the predicted categories based on the predicted categories and the respective actual labels of the examples. The loss function module 212 may be configured to determine a loss value using categorical cross-entropy loss function, for example. In some embodiments, the loss function module 212 may be configured to determine a loss value using an ultrametric tree based hierarchical loss function. The loss function module 212 may be configured to combine the loss values to generate a combined loss value. For example, the loss function module 212 may be configured to sum or add the loss values of each of the first, second and/or third hierarchical level attribute predictor(s) 204, 206, 208.

In some embodiments, the loss function module 212 is configured to determine the combined loss value by leveraging the hierarchy of the chart of accounts. For example, the loss function module 212 may be configured to apply specific weightings to loss values of predicted labels of different hierarchies, as described in more detail below with reference to the process flow of FIG. 3.

In some embodiments, for example where the second and/or third loss is determined based on outputs from the hierarchical level attribute determination module 214, the combined loss value may be an up or down weighted value of the first loss. For example, the second loss value may be a binary value which depends on whether or not the predicted second hierarchical level category corresponds with the second hierarchical level category of the label. Similarly, the third loss value may be a binary value which depends on whether or not the predicted third hierarchical level category corresponds with the third hierarchical level category of the label. The combined loss may therefore be a weighted value of the first loss, weighted to reflect the correctness or otherwise of the predicted second and third hierarchical level categories. For example, if the second loss value is 1, i.e., the prediction matches the label, the first loss may be up weighted by a predefined amount.

The combined loss value is then used to adjust or fine-tune the weights or parameters of the numerical representation generation model 210, and the hierarchical level attribute predictor 204 being trained, for example, an account code predictor. For example, a backpropagation algorithm may be used to iteratively adjust the weight(s) of the hierarchical level attribute predictor 204 and the numerical representation generation model 210 to obtain the trained attribute prediction model 122, 202.

In embodiments, for example where the numerical representation generation model 210, 118 comprises a word embedding generator neural network, the determined loss value(s) (such as categorical cross-entropy loss) or feedback signals may also be used to iteratively adjust weight(s) of the numeric representation generation model 210, 118 generating the numerical representations.

In some embodiments, end-to-end training of the transaction attribute prediction model 122, 202 including the first hierarchical level attribute predictor 204 and the numerical representation generation model 210, 118, may allow for simultaneous training and improvements in both the first hierarchical level attribute predictor 204 and the numerical representation generation model 210, 118 using a common training dataset. In some embodiments, the end-to-end training involves using a loss that leverages the chart of accounts hierarchy to allow for the simultaneous training and improvements, while acknowledging that not all account code prediction mistakes are equal; for example, an account code that belongs to the correct type and class is less incorrect than a predicted account code that belongs to the incorrect type and correct class, and which is, in turn, less incorrect than predicted account code that belongs to the incorrect type and incorrect class.

The end-to-end training may comprise back-propagating the combined error through the various layers of neurons in the first hierarchical level attribute predictor 204. Back-propagation of the error may include calculation of error gradients at each stage and adjustment of the weights of each layer of neurons based on the calculated error gradients. The back-propagation may continue further through to the input layer of at least third hierarchical level attribute predictor 208 and then onto the output layer of the numeric representation generation model 210. The back-propagation process may continue through the various layers of neurons in the numerical representation generation model 210, wherein at each stage a gradient may be calculated and weight of the neurons may be adjusted through all the layers of the numerical representation generation model 210.

For each example document of the training dataset, the combined loss value is determined and the weight(s) of the transaction attribute prediction model 122 (the numerical representation generation model 210 and the first hierarchical level attribute predictor 204, such as the account code predictor) are adjusted or fine-tuned as required, to thereby produce the trained transaction attribute prediction model 202 of FIG. 2A and FIG. 2B.

Figure 3:
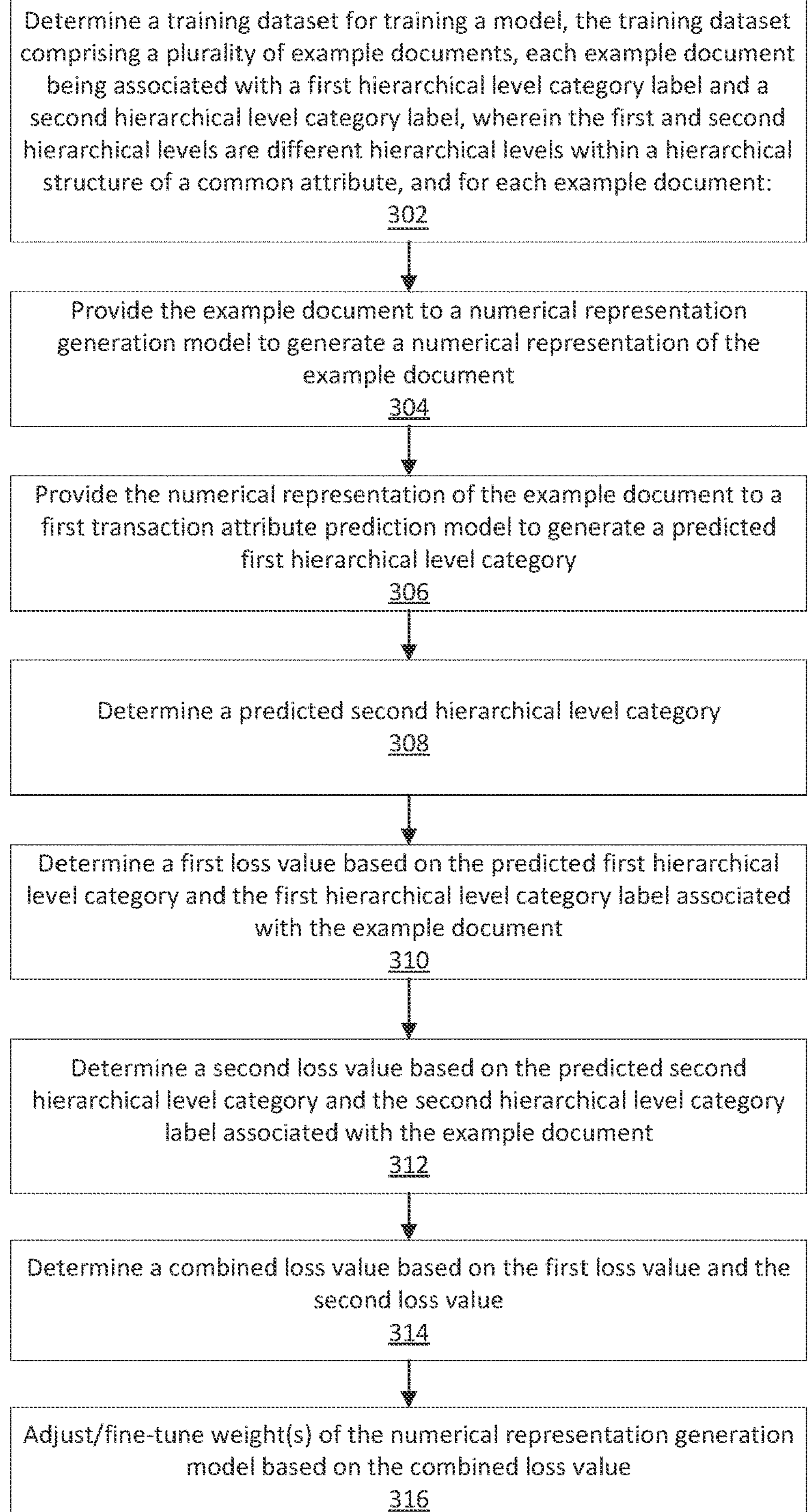
FIG. 3 is a process flow diagram of a method of training an attribute prediction model, according to some embodiments.

FIG. 3 is a process flow diagram of a method of training the transaction attribute prediction model 122 of the accounting system 102, according to some embodiments. In some embodiments, the method 300 may be performed by the processor(s) 108 of the accounting system 102 executing modules and/or models, such as the ML network 200A, 200B of FIGS. 2A, 2B as may be stored in memory 110. In other embodiments, the method 300 may be performed by one or more processor(s) (not shown) of a different, or remote system (not shown) executing computer program code, such as the ML network 200 A, 200B of FIGS. 2A, 2B stored in memory (not shown) accessible thereto. In the latter embodiment, once trained, the transaction attribute prediction model 122 may be deployed on the accounting system 102 for use.

At 302, the accounting system 102, or other system (not shown), determines a dataset or batch of training data for training a transaction attribute prediction model 122, such as an account code prediction model. The training data comprises a plurality of example documents. Each example document is associated with at least two transaction attribute category labels, such as an account code label, an account type label, and/or an account class label. For example, each example document may have, or be associated with a first hierarchical level category label and a second hierarchical level category label. The first and second hierarchical levels are different hierarchical levels within a hierarchical structure of a common attribute. In some embodiments, each example document may have, or be associated with, a further, third hierarchical level category label. The third hierarchical level may be a different hierarchical level to the first and second hierarchical levels within the hierarchical structure of the common attribute. For example, the transaction attributes, each having a hierarchical structure including multiple hierarchical level categories, may belong to a chart of accounts.

The accounting system 102, or other system (not shown), may be configured to perform steps 304 to 316 for each of the example documents of the training set to adjust, or iteratively adjust, or fine-tune weight(s) or parameter(s) of the transaction attribute prediction model 122 being trained.

At 304, the accounting system 102, or other system (not shown), provides the example document (or a character string or pre-processed character string) to the numerical representation generation model 210 of the transaction attribute prediction model 122 of the ML network 200A, 200B to generate a numerical representation of the example document. For example, the numerical representation generation model 210 may be configured to generate a numerical representation of the example document in a manner similar to that described above with respect to the numerical representation generation model 118.

At 306, the numerical representation of the example document is provided to the first hierarchical level attribute predictor 204, which generates a predicted first hierarchical level category.

At 308, the accounting system 102, or other system (not shown), determines a predicted second hierarchical level category. In some embodiments, the numerical representation of the example document is provided to the second hierarchical level attribute predictor 206, which generates the predicted second hierarchical level category, as shown in FIG. 2A. In some embodiments, the accounting system 102, or other system (not shown), is configured to determine the predicted second hierarchical level category based on the predicted first hierarchical level category. For example, and as depicted in FIG. 2B, the predicted first hierarchical level category may be provided to a transaction prediction determination module 214 which may be configured to consult with a chart of accounts to determine the predicted second hierarchical level category.

In some embodiments, for example, where the example documents are also associated with a third hierarchical level category label, the accounting system 102, or other system (not shown), determines a predicted third hierarchical level category. For example, the numerical representation of the example document may be provided to a third hierarchical level attribute predictor 208, which generates the predicted third hierarchical level category. In some embodiments, the accounting system 102, or other system (not shown), is configured to determine the predicted third hierarchical level category based on the predicted first hierarchical level category and/or the predicted second hierarchical level category. For example and as depicted in FIG. 2B, the predicted first hierarchical level category may be provided to a transaction prediction determination module 214. The transaction prediction determination module 214 may be configured to consult with the chart of accounts to determine the predicted third hierarchical level category using the predicted first and/or second hierarchical level category.

The predicted first and second hierarchical level categories may be predicted categories in different hierarchical levels within a hierarchical structure. The predicted third hierarchical level category is a predicted category in a different hierarchical level to those of the predicted first and/or second hierarchical level categories. In some embodiments, such as that depicted in FIG. 2B, the predicted first, second and/or hierarchical level categories are predicted categories in different hierarchical levels within a hierarchical structure of a common attribute.

The loss function module 212 of the ML network 200A, 200B may determine a loss function value for each of the two or more predicted attribute categories based on the predicted first, second and/or third attribute categories and the respective first, second and/or third hierarchical level category labels of the examples. For example, the loss function module 212 may be based on a categorical cross-entropy loss function, or an ultrametric tree based hierarchical loss function.

At 310, the loss function module 212 determines a first loss value based on the predicted first hierarchical level category and the first hierarchical level category label associated with the example document, and at 312, the loss function module 212 determines a second loss value based on the predicted second hierarchical level category and the second hierarchical level category label associated with the example document.

In some embodiments, the loss function module 212 determines a third loss value based on the predicted third hierarchical level category and the third hierarchical level category label associated with the example document.

At 314, the loss function module 212 determines a combined loss value based on the first loss value and the second loss value. In embodiments where the third loss value has been determined, the loss function module 212 may determine the combined loss value based on the first loss value, the second loss value and the third loss value.

In some embodiments, the loss function module 212 combines the first loss value and the second loss value, and in some embodiments the third loss value, to generate a combined loss value. For example, the loss function module 212 may be configured to sum or add the loss values of each of the first, second and/or third hierarchical level attribute category predictions to generate the combined loss value.

In some embodiments, for example where the second and/or third loss is determined based on outputs from the hierarchical level attribute determination module 214, the combined loss value may be an up or down weighted value of the first loss. For example, the second loss value may be a binary value which depends on whether or not the predicted second hierarchical level category corresponds with the second hierarchical level category of the label. The combined loss may therefore be a weighted value of the first loss, weighted to reflect the correctness or otherwise of the predicted second hierarchical level category.

In some embodiments, the individual loss values of the hierarchical level attribute category predictions may be weighted before being summed or added together to form the combined loss value. Mistakes or errors in predicted attributes for attributes in higher levels of hierarchical structure may carry more weight than mistakes in predicted attributes for attributes in lower levels. For example, the loss value of the highest hierarchical level attribute predictor(s) 204, for example, the account class predictor, may be weighted more heavily than the loss value(s) of relatively lower hierarchical level attribute predictor(s) 206, 208, such as account type or account code. Accordingly, in some embodiments, a first weighting may be applied to the first loss value and a second weighting may be applied to the second loss value. The first and second weightings may be different from one another. Where a third loss value is determined, a third weighting may be applied to the third loss value. At least two of the first, second and third weightings may be different from each other, and in some embodiments, the first, second and third weightings are all different from one another.

At 316, the loss function module 212 adjusts (or causes adjustment of) the weight(s) of the lowest hierarchical level attribute predictor 204, such as the account code predictor, and the numerical representation generation model 210 of the transaction attribute prediction model 202 based on the combined loss value.

In this way, the numerical representation generation model 210, and the lowest hierarchical level attribute predictor 204, are being trained to favour or prefer error cases not only where the predicted account code is correct, but also where the predicted account code belongs to one or more correct higher or upper levels in the chart of accounts (i.e., a correct second and/or first level of the hierarchical structure). In this way, the trained transaction attribute prediction model may be inclined to predict an account code that may have a correct class and/or type, even if an account code prediction isn't considered sufficiently accurate or correct.

Once the examples of the training dataset have been processed, the transaction attribute prediction model 202 (the numerical representation generation model 210 and/or at least the third hierarchical level attribute) may be considered trained, and the transaction attribute prediction model 202 may be deployed for use, for example, as transaction attribute prediction model 122 on the accounting system 102.

Figure 4:
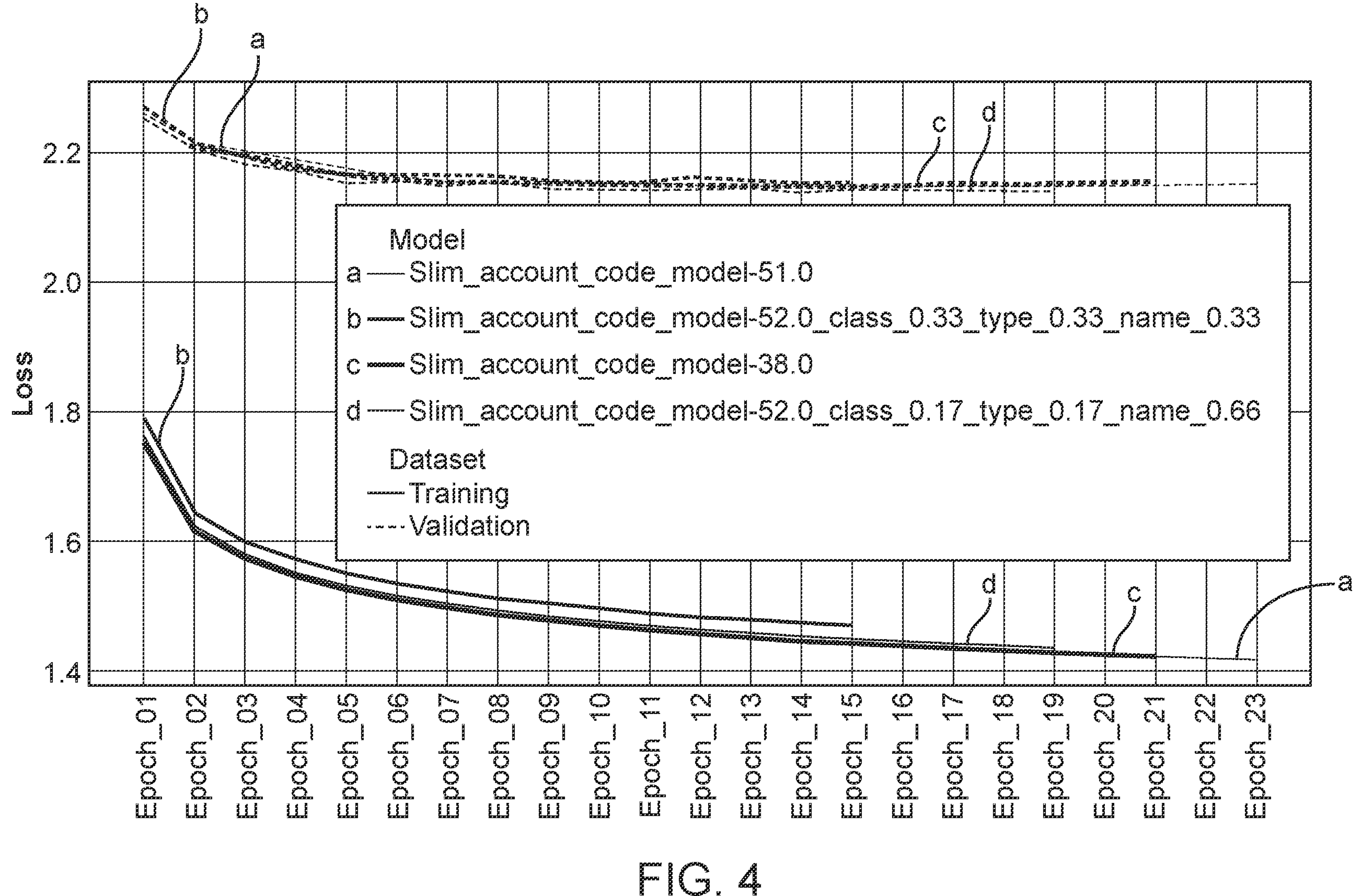
FIG. 4 is a graphical representation of loss against epochs for four different attribute predictions models.

Results from testing of attribute prediction models 202 trained according to the described methods are depicted in FIG. 4. Metrics used to determine or measure the effectiveness of the models include coverage, "cov@90", being the percentage of requests the model can respond to when it has been calibrated to be 90% accurate, and accuracy ("acc"), being the percentage of requests the model would be correct in the hypothetical scenario where it would always be responding.

A first attribute prediction model (ACE-38) configured to predict an account name was used as a first baseline model. The first attribute prediction model has associated metrics of cov@90) (100 steps)=15% and acc=45.3.

A second attribute prediction model (ACE-51) configured to predict an account name was used as a second baseline model. The second attribute prediction model has associated metrics of cov@90=14.45% and acc=45.3%. The second attribute prediction model (ACE-51) was trained on a dataset that was not cached. It was decided not to cache the training dataset in this instance because training duration had improved already without caching, and shuffling consumes a significant amount of memory. Although the accuracy reached by the second attribute prediction model (ACE-51) is slightly lower than that of the first prediction model (ACE-38), it was found that the training curve looked very similar to that of the first attribute prediction model. The benefit of faster training and dataset creation code readability associated with the second attribute prediction model may outweigh this minor decrease.

The first and second baseline prediction models were used as benchmarks to compare respective third and fourth attribute prediction models 202 trained according to the described methods using hierarchical loss.

FIG. 4 illustrates a graphical representation of loss against epochs for four different attribute predictions models. A first set of curves, represented by solid lines, relates to the performance of the models using training data, whereas the second set of curves, represented by dashed lines, relates to the performance of the models using validation data.

"Slim_account_code_model—51.0" refers to the second attribute prediction model (ACE-51) used as a benchmark, and which has not been trained using hierarchical loss.

"Slim_account_code_model—38.0" refers to the first attribute prediction model (ACE-36) used as a benchmark, and which has not been trained using hierarchical loss.

Slim_account_code_model—52.0-class_0.33, type_0.33, name_0.33" refers to the third attribute prediction model (ACE-52) which has been trained using hierarchical loss according to the described embodiments. In particular, a first weighting of 0.33 is applied to the first loss, a second weighting of 0.33 is applied to the second loss, and a third weighting of 0.33 is applied to the third loss.

Slim_account_code_model—52.0-class_0.17, type_0.17, name_0.66"" refers to the second attribute prediction model (ACE-52) which has been trained using hierarchical loss according to the described embodiments. In particular, a first weighting of 0.17 is applied to the first loss, a second weighting of 0.17 is applied to the second loss, and a third weighting of 0.66 is applied to the third loss (name).

The results, as depicted in FIG. 4 show that the hierarchical loss acts as a regularisation technique which is characterised by increase in the training loss. In this instance, the validation loss hasn't improved significantly when the weighting across the three attributes (class, type and name) is uniform (33%). However when the entropy of the account names has a higher contribution in the aggregate loss the validation loss (66%) it starts to consistently outperform the other configuration and the baseline.

Table I below compares the performance of the third attribute prediction model (with equal weightings) to the second attribute prediction model. Each metric—coverage and accuracy—was measured for each model based on four different datasets: "no suggestion val", "no suggestion test", "cold start val", and "cold start test". The datasets include two different groups or pools—"no suggestion" and "cold start". The "no suggestion" pool is made up of statement lines which did not have any suggestion available when they were reconciled, such as bank rules or memorisations. For example, there were no preconfigured rules or configurations for reconciling statement lines/financial records, with accounting records. This pool is considered as reflecting the scope of requests the accounting system is typically expected to answer or address. The "cold start" pool is built such that financial records/statement lines belonging to a first set of entity or organisations are used for a training set, financial records/statement lines belonging to a second set of entity or organisations are used for a validation (i.e. "val") set, and a third set of entity or organisations are used for a test set, and wherein there is no overlap between the entities of the first, second and third sets. This pool is considered a proxy of organisations which would be new and/or in trial. The data of each pool is divided into training, validation and testing datasets.

As shown, the third attribute prediction model trained using hierarchical loss outperformed the benchmark model by about a 1% increase in cov@90 on the cold start test −14.9% vs 13.9%).

TABLE I

| Third attribute prediction model trained using hierarchical loss | Second attribute prediction model (baseline) |
|---|---|
| cov@90: 13.8%, 14.0% (ACE-52/no suggestion val, est) | cov@90: 14.0%, 13.6% (ACE-51/no suggestion val, est) |
| cov@90: 15.7%, 14.9% (ACE-52/cold start val, test) | cov@90: 15.5%, 13.9% (ACE-51/cold start val, test) |
| acc: 45.3%, 44.6% (ACE-52/no suggestion val, test) | acc: 45.3%, 44.6% (ACE-51/no suggestion val, test) |
| acc: 45.7%, 45.9% (ACE-52/cold start val, test) | acc: 46.5%, 46.7% (ACE-51/cold start val, test) |

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method comprising:

determining a training dataset for training a model, the training dataset comprising a plurality of example documents, each example document being associated with a first hierarchical level category label and a second hierarchical level category label, wherein first and second hierarchical levels are different hierarchical levels within a hierarchical structure of a common attribute, and the second hierarchical level category label is a sub-category of the first hierarchical level category label; and for each example document in the training dataset:

providing an example document to a numerical representation generation model to generate a numerical representation of the example document;

providing the numerical representation of the example document to a first hierarchical level attribute predictor to generate a predicted first hierarchical level category;

determining a predicted second hierarchical level category;

determining a first loss value based on the predicted first hierarchical level category and the first hierarchical level category label associated with the example document;

determining a second loss value based on the predicted second hierarchical level category and the second hierarchical level category label associated with the example document;

determining a combined loss value based on the first loss value and the second loss value; and adjusting one or more weights of the numerical representation generation model based on the combined loss value; and determining the numerical representation generation model and the first hierarchical level attribute predictor to be a trained transaction attribute prediction model.

2. The method of claim 1, wherein the first hierarchical level is a lower level in the hierarchical structure than the second hierarchical level.

3. The method of claim 1, wherein determining a predicted second hierarchical level category comprises:

providing the numerical representation of the example document to a second hierarchical level attribute predictor to generate the predicted second hierarchical level category.

4. The method of claim 1, wherein determining a predicted second hierarchical level category comprises:

querying a hierarchical chart of accounts, each account being associated with multiple hierarchical level categories, using the predicted first hierarchical level category; and determining the predicted second hierarchical level category as a parent category of the predicted first hierarchical level category.

5. The method of claim 1, wherein each example document of the training dataset is further associated with a third hierarchical level category label, wherein a third hierarchical level is different from the first and second hierarchical levels within the hierarchical structure of the common attribute, the method further comprising:

for each example document in the training dataset:

determining a predicted third hierarchical level category; and determining a third loss value based on the predicted third hierarchical level category and the third hierarchical level category label associated with the example document;

wherein determining the combined loss value is further based on the third loss value.

6. The method of claim 5, wherein determining the predicted third hierarchical level category comprises:

providing the numerical representation of the example document to a third hierarchical level attribute predictor to generate the predicted third hierarchical level category.

7. The method of claim 5, wherein determining the predicted third hierarchical level category comprises:

querying a hierarchical chart of accounts, each account being associated with multiple hierarchical level categories, using the predicted first hierarchical level category; and determining the predicted third hierarchical level category as a grandparent category of the predicted first hierarchical level category.

8. The method of claim 1, wherein the first hierarchical level of the hierarchical structure of the common attribute is an account code.

9. The method of claim 1, wherein the second hierarchical level of the hierarchical structure of the common attribute is an account type.

10. The method of claim 5, wherein the third hierarchical level of the hierarchical structure of the common attribute is an account class.

11. The method of claim 1, wherein the second hierarchical level of the hierarchical structure of the common attribute is an account class.

12. The method of claim 1, wherein the first hierarchical level of the hierarchical structure of the common attribute is an account type.

13. The method of claim 12, wherein the second hierarchical level of the hierarchical structure of the common attribute is an account class.

14. The method of claim 1, wherein determining the combined loss value comprises:

applying a first weighting to the first loss value and applying a second weighting to the second loss value.

15. The method of claim 1, further comprising:

deploying the trained transaction attribute prediction model on an accounting system.

16. A system comprising:

one or more processors; and memory comprising computer executable instructions, which when executed by the one or more processors, cause the system to:

determine a training dataset for training a model, the training dataset comprising a plurality of example documents, each example document being associated with a first hierarchical level category label and a second hierarchical level category label, wherein first and second hierarchical levels are different hierarchical levels within a hierarchical structure of a common attribute, and the second hierarchical level category label is a sub-category of the first hierarchical level category label; and for each example document in the training dataset:

provide an example document to a numerical representation generation model to generate a numerical representation of the example document;

provide the numerical representation of the example document to a first hierarchical level attribute predictor to generate a predicted first hierarchical level category;

determine a predicted second hierarchical level category;

determine a first loss value based on the predicted first hierarchical level category and the first hierarchical level category label associated with the example document;

determine a second loss value based on the predicted second hierarchical level category and the second hierarchical level category label associated with the example document;

determine a combined loss value based on the first loss value and the second loss value; and adjust one or more weights of the numerical representation generation model based on the combined loss value; and determine the numerical representation generation model and the first hierarchical level attribute predictor to be a trained transaction attribute prediction model.

17. A non-transitory computer-readable storage medium storing instructions that, when executed by a computer, cause the computer to perform operations comprising:

determining a training dataset for training a model, the training dataset comprising a plurality of example documents, each example document being associated with a first hierarchical level category label and a second hierarchical level category label, wherein first and second hierarchical levels are different hierarchical levels within a hierarchical structure of a common attribute, and the second hierarchical level category label is a sub-category of the first hierarchical level category label; and for each example document in the training dataset:

providing an example document to a numerical representation generation model to generate a numerical representation of the example document;

providing the numerical representation of the example document to a first hierarchical level attribute predictor to generate a predicted first hierarchical level category;

determining a predicted second hierarchical level category;

determining a first loss value based on the predicted first hierarchical level category and the first hierarchical level category label associated with the example document;

determining a second loss value based on the predicted second hierarchical level category and the second hierarchical level category label associated with the example document;

determining a combined loss value based on the first loss value and the second loss value; and adjusting one or more weights of the numerical representation generation model based on the combined loss value; and determining the numerical representation generation model and the first hierarchical level attribute predictor to be a trained transaction attribute prediction model.

18. The method of claim 1, wherein the hierarchical structure is a hierarchical classification structure of a chart of accounts.

19. The system of claim 16, wherein the hierarchical structure is a hierarchical classification structure of a chart of accounts.

20. The computer-readable storage medium of claim 17, wherein the hierarchical structure is a hierarchical classification structure of a chart of accounts.

* * * * *